(12) United States Patent
Choi

(10) Patent No.: US 6,304,399 B1
(45) Date of Patent: Oct. 16, 2001

(54) AUTOMATIC HEAD SWITCHING CONTROL METHOD AND APPARATUS

(75) Inventor: Nag-eui Choi, Ansan (KR)

(73) Assignee: Samsung Electronics Co., Ltd., Kyungki-Do (KR)

(*) Notice: Subject to any disclaimer, the term of this patent is extended or adjusted under 35 U.S.C. 154(b) by 987 days.

(21) Appl. No.: 08/525,152

(22) Filed: Sep. 8, 1995

(30) Foreign Application Priority Data

Sep. 8, 1994 (KR) .................................................. 94-22642

(51) Int. Cl.$^7$ ........................... G11B 15/14; G11B 21/04; H04N 5/91
(52) U.S. Cl. .................. 360/64; 360/70; 386/46; 386/80
(58) Field of Search .................... 360/64, 70, 73.06, 360/73.11, 109; 358/320, 323; 386/67, 80, 46, 51

(56) References Cited

U.S. PATENT DOCUMENTS 5,243,474 * 9/1993 Mitsuhashi .............................. 360/70
5,448,367 * 9/1995 Park et al. ................................ 386/9

* cited by examiner

*Primary Examiner*—Regina Y. Neal
(74) *Attorney, Agent, or Firm*—Sughrue, Mion, Zinn, Macpeak & Seas, PLLC

(57) ABSTRACT

An automatic head switching control method and apparatus detects whether an interval between a head switching point of time and a vertical sync signal is 6.5 horizontal sync signal intervals and repeats processes for altering head switching delay data $t_D$, thereby generating a head switching signal having an appropriate head switching point of time and altering only a head switching point of time for one head during the repeat of the altering process. Accordingly, the velocity change of a drum motor does not occur and a control time is reduced as compared to an envelope detection type controller.

7 Claims, 4 Drawing Sheets

(A)

(B) 2ND HEAD    1ST HEAD (C) 6.5H   6.5H   6.5H   6.5H
V-Sync (D)

(E)

AUTOMATIC HEAD SWITCHING CONTROL METHOD AND APPARATUS

BACKGROUND OF THE INVENTION

The present invention relates to a head switching control apparatus and method for use in a video cassette recorder having at least two heads, and more particularly to an automatic head switching control method and apparatus which detects whether a delay time between a head switching point of time and a vertical sync signal is within a predetermined range, and generates a head switching signal according to head switching delay data in order to control a head switching operation.

The head switching control is necessarily needed to maintain a uniform relative position between a video head attached to a drum and a video signal recorded on a tape, when one frame is formed of signals picked up by a plurality of heads.

The head switching point of time is determined by the head switching signal. In a VHS system, the head switching point of time is produced at an interval of time prior to a rising edge of a vertical sync signal of a video signal ranging between five horizontal sync intervals (5H) and eight horizontal sync intervals (8H).

FIG. 1 is a waveform timing diagram showing a process of producing a head switching signal in the VHS system.

FIG. 1 shows a drum phase generation DPG signal (wave form A) and a drum frequency generation DFG signal (waveform B), which are generated from a head drum, respectively. Waveform C of FIG. 1 shows a head switching signal for determining a head switching point of time. Waveform D of FIG. 1 shows a vertical sync signal of a video signal. In the VHS system, the head switching point of time of the head switching signal should lead the vertical sync of the video signal by 5H through 8H centered at 6.5H. As shown by waveforms C and D in FIG. 1, the head switching point of time leads the vertical sync signal by 6.5H.

An interval $t_{HD}$ for determining the head switching point of time is determined by a time $t_{fg}$ from a falling edge of the DPG signal to a first rising edge of the DFG signal and a delay time $t_D$ which is determined by head switching delay data which is controlled by a controller.

The relationship between the head switching delay data (hereinafter referred to as the delay data) and the delay time follows an equation (1).

$$t_D = \frac{(N+1) \cdot 32}{f_{sc}} \quad (1)$$

Here, $t_D$ is a delay time, N is delay data of which the unit is one byte (8 bits), and $f_{sc}$ is a color subcarrier sync frequency.

Since time $t_{fg}$ is a fixed value in a drum system, an automatic head switching control represents that the delay data varies stepwisely and delay time $t_D$ is controlled by the controller, in order to match a head switching point of time.

FIG. 2 is a block diagram of a conventional automatic head switching control apparatus.

In FIG. 2, a video processor 1 includes a pre-amplifier (not shown). The pre-amplifier detects an envelope state, that is, an amount of a video signal which is currently picked up by the video heads, and supplies the detected information to controller 2. Controller 2 generates delay data for altering delay time $t_D$ according to the envelope detection signal. The output end of controller 2 is connected to a servo portion 3. A head switching signal is determined by signals DPG and DFG applied from a drum 4 and the delay data output from controller 2. Servo portion 3 supplies a control signal to a motor in drum 4 according to the head switching signal. The controlled drum motor rotates in drum 4 and a video signal is read out from a recording medium by the video heads attached to the drum. The read video signal is supplied to video processor 1 to detect a new envelope state. Such an operation repeats while altering the delay data, until the envelope detection signal becomes a high-level state. When a high-level envelope detection signal is applied to controller 2 from video processor 1, the delay data at this time is stored in controller 2.

However, the above conventional automatic head switching control method has a problem. The interval between the head switching point of time and the vertical sync signal cannot be maintained invariably in the VHS system when the pre-amplifier does not have an accurate envelope detection performance. Since the drum motor is controlled every time with respect to the delay data varying in the controller, it is another problem that it takes a considerable time to control a head switching operation due to a time taken until the velocity of the drum motor is stabilized.

SUMMARY OF THE INVENTION

Therefore, to solve the above problems, it is an object of the present invention to provide an automatic head switching control method and apparatus which detects whether an interval between a head switching point of time and a vertical sync signal is within a predetermined range, and uses delay data in order to control a head switching operation, irrespective of an envelope detection performance.

Another object of the present invention is to provide an automatic head switching control method and apparatus which alters only a head switching point of time of one head among a plurality of heads attached to a drum while finding delay data meeting a format, and then maintains the consistent velocity of a drum motor while controlling a head switching operation, thereby shortening a control time.

Thus, to accomplish the above object of the present invention, there is provided an automatic head switching control apparatus, the apparatus comprising:

a head switching signal generator for generating a head switching signal according to a drum phase generation (DPG) and a drum frequency generation (DFG) signal supplied from the drum, delay data, and a shift command signal of a head switching point of time; a format detector coupled to an output end of the head switching signal generator, for comparing the head switching signal with a vertical sync signal of a video signal and detecting whether an interval of time between both the head switching signal and the vertical sync signal meets a predetermined range; a controller for supplying the delay data and the shift command signal of the head switching point of time for each head to the head switching signal generator according to the output of the format detector; a storage portion for storing the delay data generated when the format detector judges that the format is met; and a drum phase detector for detecting a drum phase according to a drum reference signal output from a drum reference counter and the head switching signal output from the head switching signal generator, and supplying a drum phase control signal to the drum.

Also, the above object of the present invention is to provide an automatic head switching control method, the method comprising the steps of:

obtaining delay data adapted to a format while shifting the head switching point of time for a only one head; generating a head switching signal of which a head switching point of time for each head is shifted by the determined appropriate adapted delay data; and controlling a head switching operation by varying the velocity of a drum motor according to the head switching signal.

BRIEF DESCRIPTION OF THE DRAWINGS

The preferred embodiments are described with reference to the drawings wherein.

DETAILED DESCRIPTION OF THE PREFERRED EMBODIMENT

A preferred embodiment of the present invention will be described below in more detail with reference to the accompanying drawings FIGS. 3 through 5.

Figure 1:
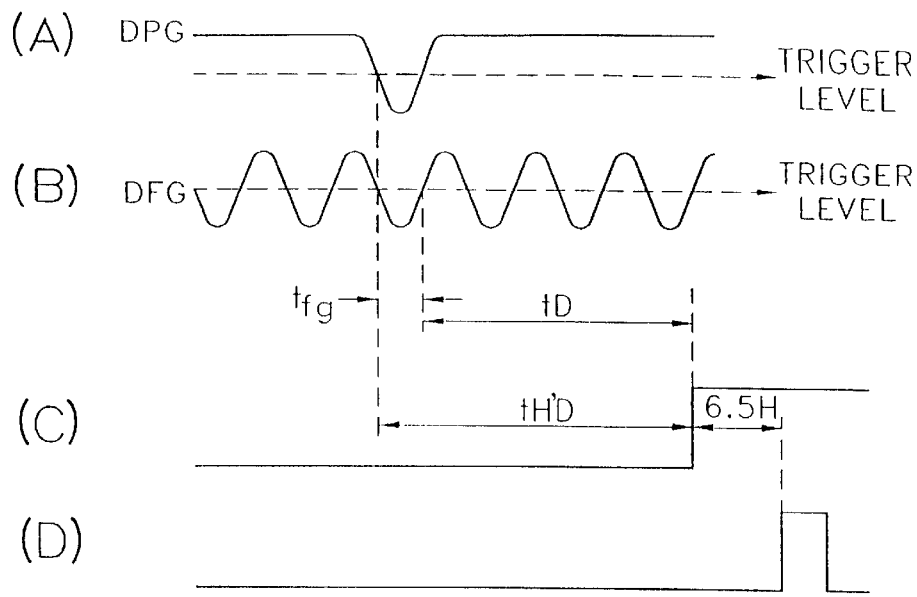
FIG 1 is a waveform timing diagram with waveforms A through D showing a process of producing a head switching signal in the VHS system.
Figure 2:
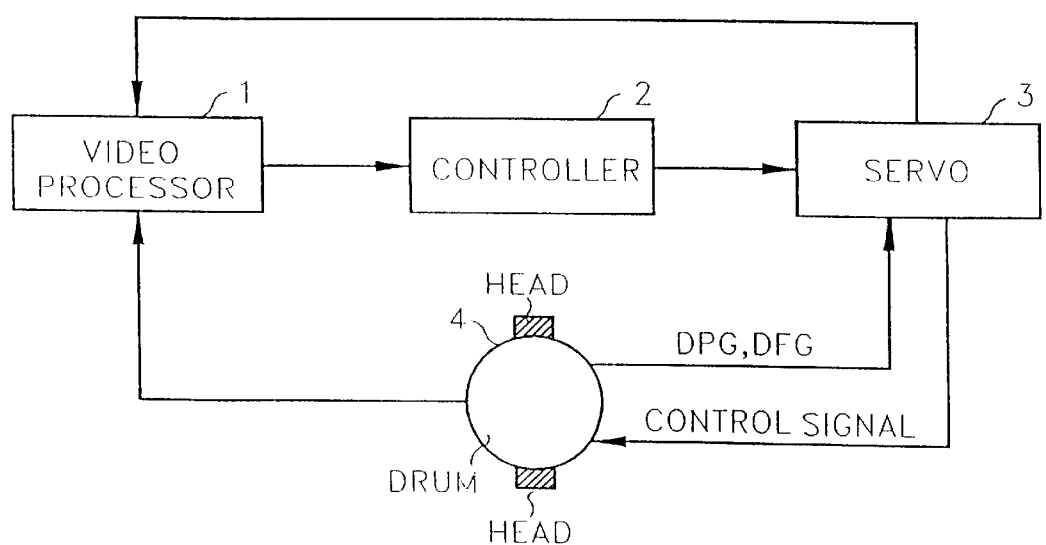
FIG. 2 is a block diagram showing a conventional automatic head switching control apparatus.
Figure 3:
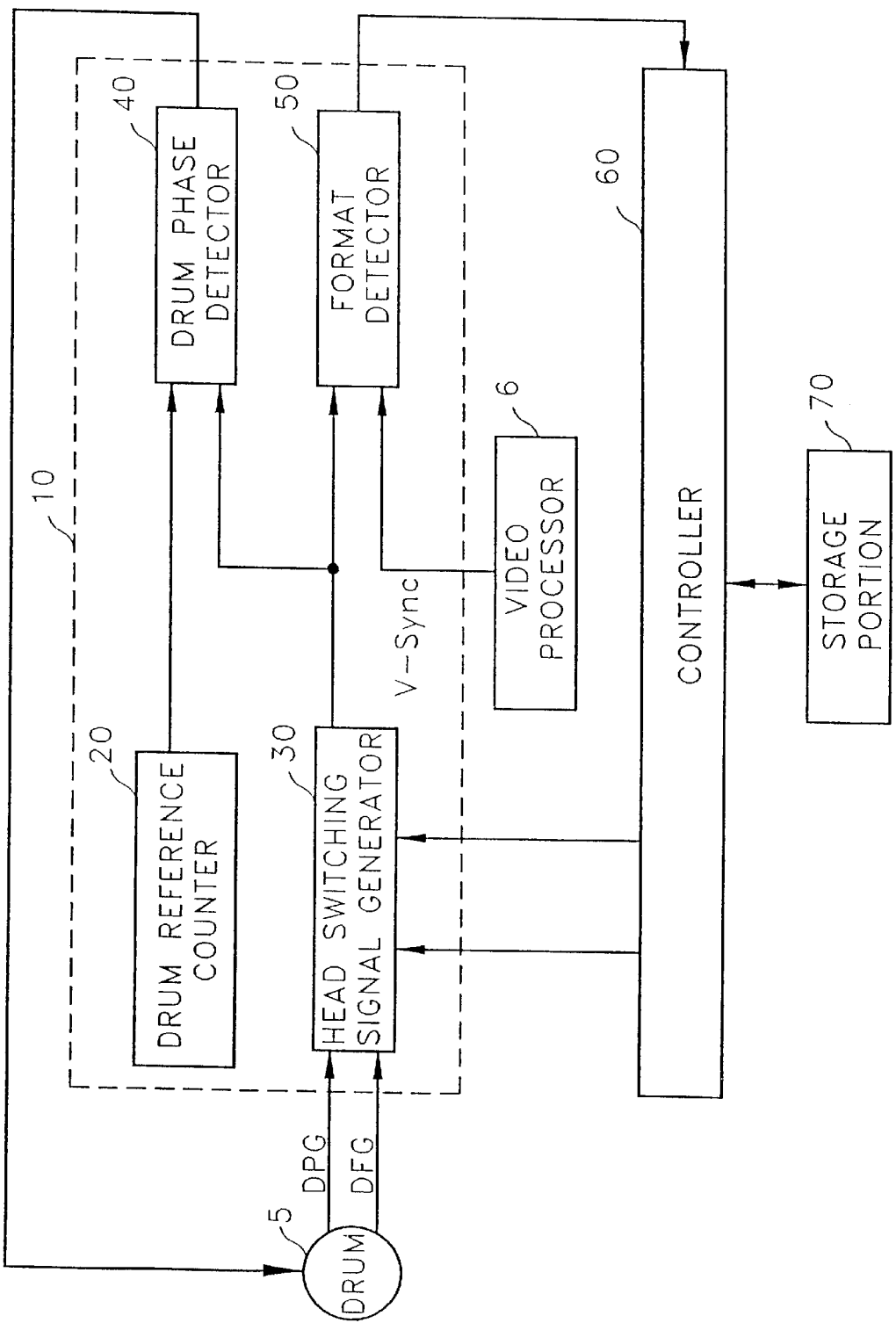
FIG. 3 is a block diagram showing an automatic head switching control apparatus according to the present invention.

In FIG. 3 showing an automatic head switching control apparatus according to the present invention, a drum reference counter 20 produces a reference signal and outputs the reference signal to a drum phase detector 40. A head switching signal generator 30 generates a head switching signal. A head switching point of time of the head switching signal is determined by a drum phase generation signal DPG and a drum frequency generation signal DFG input from drum 5, and a shift command signal of the head switching point of time for each head. The head switching signal output from the head switching signal generator 30 is input to drum phase detector 40 and a format detector 50, respectively.

Format detector 50 connected to the output end of head switching signal generator 30 compares the head switching signal with a vertical sync signal supplied from video processor 6, detects whether an interval of time between the head switching point of time of the head switching signal and the vertical sync signal is within a predetermined range according to the format, and outputs the detection result to a controller 60.

Controller 60 outputs serial data for altering delay data stepwisely to head switching signal generator 30, when the detection result of the format detector represents being unformatted, shifts only a head switching point of time of one head among a plurality of heads, and outputs the shift command signal of the head switching point of time for each head in order to fix the head switching points of time for the remainder heads, to a head switching signal generator 30.

The above processes repeats until format detector 50 judges that the head switching point of time for the head shifted by the delay data meets the format.

A feature of the present invention resides in a fact that the velocity of the drum motor does not vary during repeating the above processes. The reason is because the output of drum phase detector 40 is constant. Drum phase detector 40 compares the head switching signal with the reference signal, thereby performing a function of controlling an error therebetween. Since alteration of only a head switching point of time with respect to one head represents that only a pulse width is altered while maintaining the frequency of the head switching signal to be constant, the output of drum phase detector 40 is constant.

In the result of repeating the above processes, if format detector 50 judges that the head switching point of time for the head shifted by the delay data meets the format, controller 60 instructs storage portion 70 to store the appropriate delay data therein. An EEPROM is preferably used as the storage portion. Here, controller 60 outputs the appropriate delay data and a signal for shifting the head switching points of time for all the head to the head switching signal generator.

Finally, head switching signal generator 30 generates a head switching signal of which the head switching points of time for all the head are altered to be met with the format, and drum phase detector 40 outputs a drum phase control signal for altering the velocity of the drum motor according to the head switching signal so that a head switching operation is performed.

Figure 4:
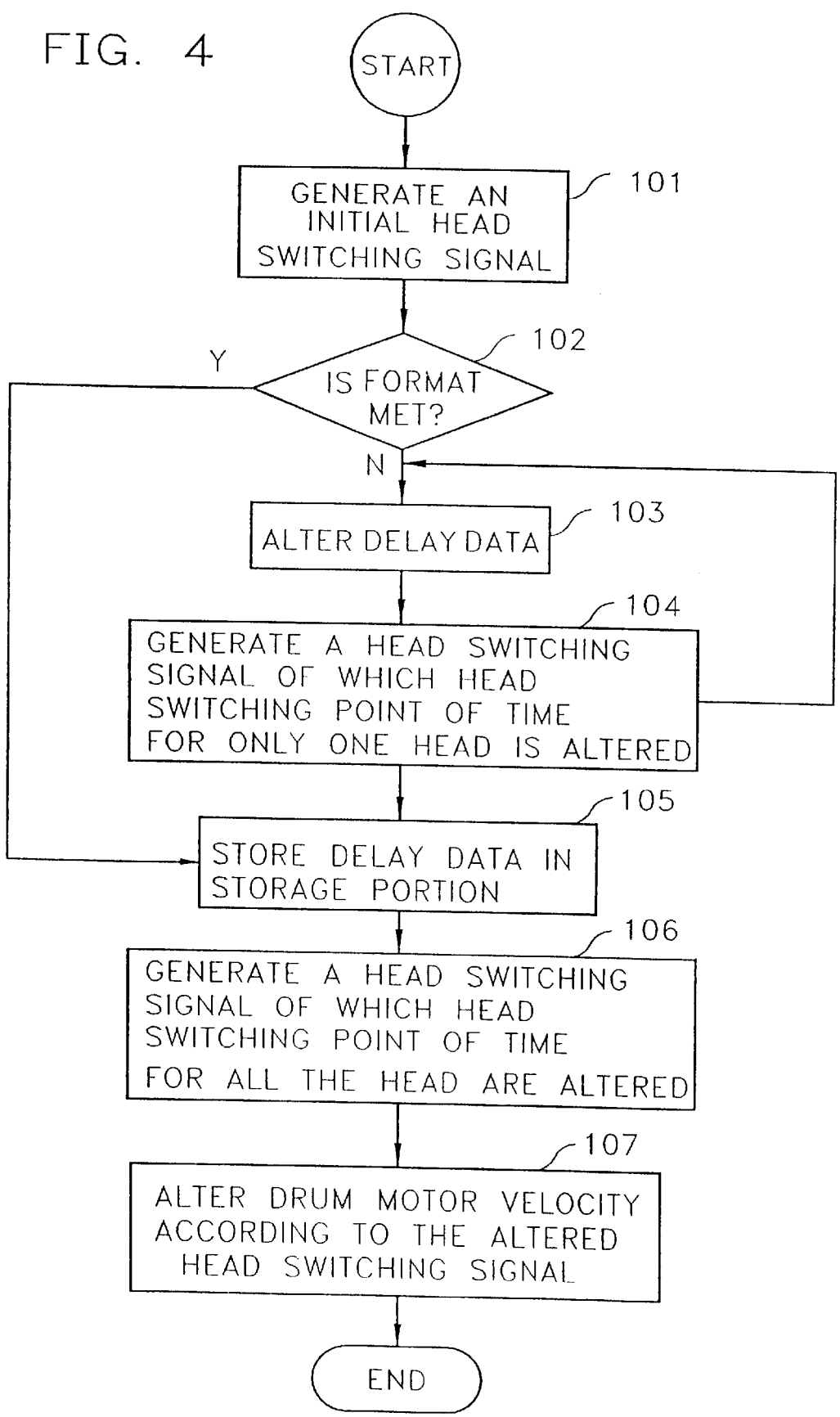
FIG. 4 is a flow-chart diagram of an automatic head switching control method according to the present invention.

FIG. 4 is a flow-chart diagram for explaining an automatic head switching control method according to the present invention.

In the FIG. 4 flow-chart diagram, an intial head switching signal is firstly generated in step 101. It is judged whether the head switching point of time of the head switching signal is met with the format in step 102. If it is judged that it is appropriate to the format in step 102, the delay data is stored in a storage portion in step 105. On the other hand, if it is judged that it is not appropriate to the format in step 102, the delay data is stepwisely altered in step 103. A head switching signal of which the head switching point of time for a only one head is altered by the altered delay data is generated in step 104. The processes of steps 103, 104 and 102 repeat until it is judged that the head switching point of time meets the format. An altered head switching signal of the head switching points of time for all the heads is generated in step 106, on the basis of the appropriate delay data stored in the storage portion. The velocity of the drum motor is altered by the altered head switching signal, to thereby complete controlling of the head switching operation in step 107.

Figure 5:
FIG. 5 is a waveform timing diagram showing relative timing of waveforms A through E to illustrate a process in which a head switching signal is automatically controlled in an embodiment of the present invention with respect to a two-head system having the VHS format.
Figure 5:
Figure 5:
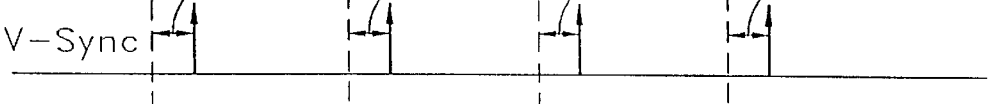
Figure 5:
Figure 5:

FIG. 5 is a waveform timing diagram showing a process in which a head switching signal is automatically controlled in an embodiment of the present invention with respect to a two-head system having the VHS format.

In FIG. 5, waveform A shows a phase generation signal DPG generated in drum 5. Waveform B in FIG. 5 shows an intial head switching signal output from head switching signal generator 30. When comparing the vertical sync signal shown in waveform C of FIG. 5 with the initial head switching signal of waveform B, it can be seen that since the interval of time is much larger than 6.5H, the head switching signal is not appropriate to the VHS format.

Waveform D of FIG. 5 shows a head switching signal of which the head switching point of time is altered to meet the VHS system, by altering the delay data while fixing a head switching point of time of a first head. Referring to waveform D, it can be seen that the frequency of the head switching signal does not vary. Waveform E shows a final head switching signal of which the head switching points of time of the first and second heads are altered by the determined appropriate delay data.

As described above, the automatic head switching control method and apparatus according to the present invention, detects whether an interval between the head switching point of time and the vertical sync signal meets the format, repeats the processes for altering the head switching delay data, generates a head switching signal having an appropriate head switching point of time, and altering only a head switching point of time for a only one head during the repeat of the altering processes, thereby avoiding the velocity change of the drum motor during the control of the head switching operation to shorten a control time irrespective of an envelope detection performance.

While only certain embodiments of the invention have been specifically described herein, it will apparent that numerous modifications may be made thereto without departing from the spirit and scope of the invention.

What is claimed is:

1. An automatic head switching control apparatus for use in a VCR having a drum driven by a drum motor, said drum having a plurality of heads, the apparatus comprising:

a head switching signal generator for generating a head switching signal according to drum phase generation (DPG) and drum frequency generation (DFG) signals supplied from the drum, delay data, and a shift command signal of a head switching point of time for each head;

a format detector coupled to an output end of the head switching signal generator, for comparing the head switching signal with a vertical sync signal of a video signal and detecting whether an interval of time between both the head switching signal and the vertical sync signal meets a predetermined range;

a controller for supplying the delay data and the shift command signal of the head switching point of time for each head to the head switching signal generator according to the output of the format detector;

a storage portion for storing the delay data generated when the format detector judges that the format is met; and a drum phase detector for detecting a drum phase according to a drum reference signal output from a drum reference counter and the head switching signal output from the head switching signal generator, and supplying a drum phase control signal to the drum.

2. The automatic head switching control apparatus according to claim 1, wherein said controller performs the following functions of:

stepwisely altering the delay data until the format detector judges that the generated head switching signal meets the format;

applying a signal for shifting a switching point of time for a only one head according to the altered delay data, to the head switching signal generator together with the altered delay data:

storing the delay data in the storage portion when the format detector judges that the generated head switching meets the format; and applying a signal for shifting head switching points of time of all the heads according to the stored delay data, to the head switching signal generator together with the stored delay data.

3. The automatic head switching control apparatus according to claim 2, wherein said format detector judges whether the head switching point of time of the head switching signal leads the vertical sync signal of the video signal by a time period ranging from 5H through 8H in which H indicates a horizontal sync signal period.

4. The automatic head switching control apparatus according to claim 3, wherein said storage portion is an Electrically Erasable Programmable Read Only Memory.

5. An automatic head switching control method, the method comprising the steps of:

(a) obtaining delay data adapted to a format while shifting a head switching point of time;

(b) generating a head switching signal of which a head switching point of time for each head is shifted by the adapted delay data; and (c) controlling a head switching operation by varying the velocity of a drum motor according to the head switching signal.

6. The automatic head switching control method according to claim 5, wherein said step (a) comprises the steps of:

(a1) stepwisely altering the delay data;

(a2) generating a head switching signal of which the head switching point of time for a only one head is shifted by the altered delay data;

(a3) comparing the head switching signal with a reference signal to judge whether the head switching signal meets the format; and (a4) repeating the above steps (a1) through (a3) until the head switching signal meets the format.

7. The automatic head switching control method according to claim 6, wherein said step (a3) judges whether the head switching point of time of the head switching signal leads a vertical sync signal of a video signal by a time period ranging from 5H through 8H, wherein H indicates a horizontal sync period.

* * * * *